Dec. 5, 1933.  S. C. G. EKELUND  1,938,139
METHOD OF PRODUCING COMBUSTIBLE GAS
Filed Sept. 15, 1927
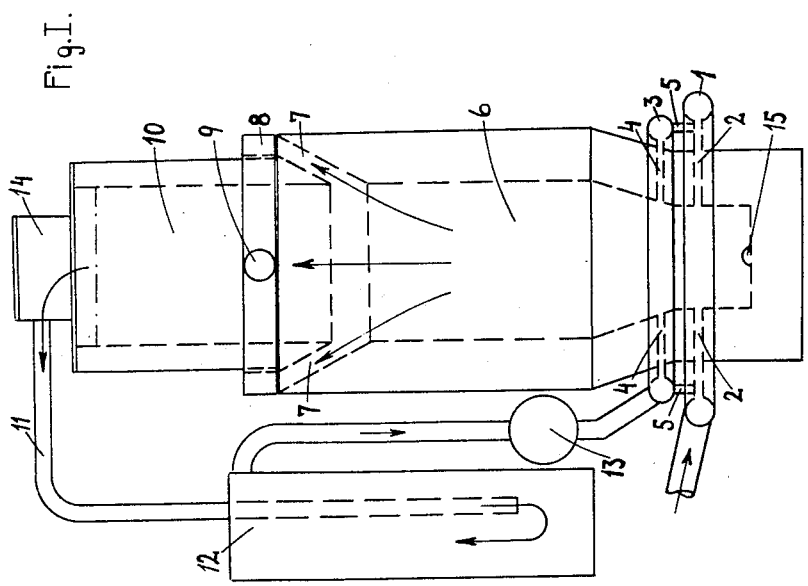
Witnesses:
Inventor.

Patented Dec. 5, 1933

1,938,139

UNITED STATES PATENT OFFICE 1,938,139

METHOD OF PRODUCING COMBUSTIBLE GAS

Sven Carl Gunnar Ekelund, Stockholm, Sweden

Application September 15, 1927, Serial No. 219,778, and in Sweden June 27, 1927

4 Claims. (Cl. 48—203)

My invention relates to a new method of producing gas in gas-producers as well as certain improvements in gas-producers required for a successful utilization of the method. This case is continuation in part of my prior application No. 141,830 filed October 15, 1926 now Patent No. 1,758,786.

The invention has for its principal objects, first, to produce a reducing gas, which is composed of merely a few single components, such as carbon monoxide, hydrogen and nitrogen; second, to produce such a gas also from an uncoked fuel; third, to produce a gas with such a high temperature, that is may be used for certain metallurgical purposes without being previously preheated; fourth, to provide a gas producing system, capable of delivering a gas with these qualities.

As an ingress some circumstances connected with the producing of gas in an ordinary way are first to be mentioned. If an uncoked fuel, as coal or peat, or a partially coked one, is gasified, so are all or the greatest part of the volatile matters of the fuel to be found in the producer gas without being decomposed. The volatiles consist of steam, carbon dioxide, hydrocarbons and sulphuretted hydrogen. When using the producer gas for such a purpose as reduction of ores the enumerated constituents are detrimental for the process, first, because the reducing power of the gas is lowered; second, because of a very undesirable deposition of solid carbon, caused by the hydrocarbons, that may badly clog the furnace; and third, because the sulphur in the gas will be absorbed by the reduced metal and spoil its good qualities.

A decomposition of the volatiles and absorption of the sulphur already in the producer must therefore be realized to fill the conditions given above.

As it has been stated, that slagging gas producers, i.e. producers of the type, in which the ash contents of the fuel is caused to melt and is removed in a liquid form, are able to produce a gas suitable for reduction purposes, in a more rational manner than in ordinary producers while the principle of gasifying the fuel, by melting the ash simultaneously is utilized also in my method. However, in combination with this principle there is another that must be employed, if it shall be possible to solve the problem wholly.

The principle referred to is briefly, that the volatiles must be caused to enter and pass through the hot zone of the producer, before they are allowed to leave the same. For the gasifying medium oxygen from the air may be used. The way, in which the principle is to be practised, is preferably the following.

A certain portion of the hot gas, coming from the partial combustion zone of the producer and going upwards, is caused to pass by the main gas outlet and is withdrawn through a preheating chamber, in which the fuel is first charged. The hot gas will here deliver its sensible heat to the fuel, preheating it and causing it to give off its volatile matters. These are thus mixed with the producer gas and the gas-mixture is then made to enter into the hot fuel zone of the producer. Therein the gas will be decomposed into carbon monoxide and hydrogen, which gases together with nitrogen constitute the major part of the gas obtained from the producer directly from the producer gas outlet, and the sulphur of the distillation gases will be combined with the slag as well as the sulphur of the coke. In this way the gas is to a certain extent made to circulate in the producer.

As mentioned previously and later on, the purpose of the invention cannot be obtained, without adopting the gas circulation principle to a slagging gas producer. The reasons for this fact are not difficult to understand. In a gas producer not working with fusion of the ash or slag the rate of gasification is much lower and therefore the temperature everywhere in the producer will be relatively low. The quantity of "surplus heat" in the partial combustion zone is also small, and the process will be imperative when a considerable amount of cold circulation gas is still lowering the temperature. This of course especially when the gas is allowed to contain steam in excess. The steam will then interfere with the process in such a way, that the carbon monoxide partly is transformed to carbon dioxide, whereby, consequently, the caloric value of the gas will be lowered and the gas cannot be used for reduction of ores.

A balance of heat made up for a gas producing process with gas circulation adapted to the system will show, that by using the gas circulation principle it is, under certain conditions and especially in a slagging gas producer, possible to obtain a very hot gas and this without overheating the partial combustion zone of the same. The reason for this remarkable fact is, that by the circulation the heat is spread upwards in the producer; the upper layers of fuel are getting warmer and the lower colder than is the case, when no circulation is employed. This makes it possible to use preheated air or air with an addition of oxygen, whereby the temperature in the partial combustion zone is again raised to its normal value, but the temperature of the upper zones of the producer at the main gas outlet and of the gas withdrawn is raised furthermore. The calculation will show that when gasifying rather good coals by means of air preheated to 400° C. it is possible to obtain the gas with a temperature of 1000° C. This means, as is already stated, that the gas directly from producer can be used for important metallurgical purposes as reduction of ores and also for melting metals, as f. i. iron in the openhearth process, without employing regenerators.

The gas obtained from the gas producer may have the following composition of approximately 30% CO, 10% $H_2$ and 60% $N_2$. The composition may, however, vary and particularly the ratio of hydrogen to carbon monoxide.

Also when gasifying coke or charcoal a gas circulation is preferably to be used, particularly when the fuel is moist. It will then be dried and preheated when coming down under the main gas outlets of the producer. Certain advantages can be reached by introducing steam into the fuel bed of the producer, coke oven gas, other similar gases containing hydrogen, as natural gas, blast furnace gas, flue gas from an electrical blast furnace, or raw oil, all these additions preferably together with hot air and introduced into the hot zone of the producer.

The simplest arrangement of the distillation zone is to let it occupy a chamber placed directly over the gas generating chamber and over the level in which the inner openings of the main gas outlets are opening towards that chamber. The shaft diameter may be the same or smaller above the gas generating chamber than under the same.

The circulation gas is preferably being drawn through a pipe by means of an exhauster, enclosed rotary blowers or ejectors. In order to diminish as far as possible the quantity of producer gas used for the preheating this amount of gas may be withdrawn from the hot zone of the producer and in a special pipe by its own pressure passed over to the distillation zone. Usually such a method will, however, mean a complication of the process. The circulation gas can be introduced at any suitable height above the bottom of the producer: above, below or in the combustion zone of the producer. When introduced in the same level as the air, the gas is advantageously burnt wholly or partly with the air, because of the fact that the temperature of combustion is then getting lower than when the incandescent coke is directly burned by the air. Burning the circulation gas immediately decomposes the volatiles, and the oxidized products are thereafter reduced by carbon. The tuyères are preferably to be made as burners, letting them also act as ejectors, so that the air is drawing the gas with it, the gas in this way sweeping around the central pipe keeping it sufficiently cold. The amount of circulation gas is then to be moderated either by altering the velocity of air in the pipe openings or by means of valves in the gas piping. The number of tuyères depends on the size of producer. Tar may be extracted from the circulation gas by condensing. When treating highly bituminous coal this is of economic importance.

An advantage of the slagging gas producer is, that the coal may be charged in a fairly small size, ¼" as a minimum. In the circulating gas main pipe a dust collector is probably necessary to let the gas pass before it is entering the blower. If using ejector blowers the dust may not be so troublesome. The dust may be briquetted and so charged once again or it may be recombined with the gas on the high pressure side of the blower or immediately put in the gas or air stream in the tuyères.

The hearth of the producer is to be provided with a refractory lining preferably of magnesite bricks, bauxite bricks or carbon bricks or other materials capable of resisting a liquid slag of basic character. The slag being basic it will readily absorb the sulphur from the coke and the circulation gas. If, however, the finished producer gas still contains a small portion of the sulphur, this can be removed by passing the gas through a layer of lime, which at the high temperature of the gas absorbs the sulphur forming calcium sulphide. In order to fuse an acid ash of the fuel basic additions, such as lime, limestone or slag, are charged on the producer. Granulated blast furnace slag may be used. Slag and limestone will hardly form any dust, which is an advantage. The limestone prevents the coal from sticking in the distillation zone, and therefore no more stoking is wanted in the case of gasifying coal than for gasifying coke. If coal with a great caking ability is used it may be suitable to mix the coal with some coke, peat or the like. If using an iron-containing slag or if charging iron ores in the producer, pig iron is obtained as a byproduct in addition to the slag. The latter may also be of a certain value as a raw material for making cement, if it is holding proper amounts of silicic acid, lime, aluminium oxide etc. The usefulness of the slag for this purpose may be improved by adding also a material containing titanic acid to the charge. The accompanying drawing illustrates a producer as proposed for the process. Fig. 1 is an elevation of the producer seen from the outside.

On Fig. 1 hot air is supplied to the annular tube 1 and is introduced into the fuel bed of the producer through the tuyère openings 2. The recirculated gas is passing into the annular tube 3 and is, as shown in the drawing, introduced partly through the tuyère openings 4 and partly through the pipes 5, connected to the air tuyères. The gas can also wholly be passed one way either at 4 or at 5. Burning the gas with the air is possible only, when entering the air tuyère openings or slightly above. The gas rising upwards in the producer divides near the conduits 7, through which the major portion of the gas is withdrawn to the annular pipe 8 and the outlet 9, and a certain amount flows further upwards through the preheating and coal distillation chamber 10, driving off the moisture and some of the volatiles, and the gas mixture is relatively cold when leaving the chamber through the piping 11, passing thence to the dust collector 12 and eventually some other well known cleaning means and condensor, not shown in the drawing, and is assembling the blower 13, from which it is passed through a conduit entering the annular pipe 3 into the fuel bed of the producer. In the incandescent fuel bed the distillation products are decomposed into single gases. The fixed producer gas is drawn off through the outlets 7, 8, and 9. The gas outlet flues 7 are given an inclined position, to prevent coarse dust from following the gas. At the top 14 means should be provided for continuously feeding fuel such as coal or coke, and fluxes such as chalk and slag into the chamber. This may be done by a screw conveyor. The chamber should always be filled with fuel up to a constant level, in the drawing denoted by a dot and dash line. At the flues 7 either a gas collecting cylindrical iron ring is suspended or arranged in the inside wall of the producer or the shaft diameter is being enlarged below the flues, so that the gas assembles in a free space above an annular, oblique surface of the fuel. The molten slag is tapped at the bottom at 15, and when pig iron is produced, the slag may be tapped through a certain taphole a little higher up on the hearth. Regulating means for the air and the circulation gas and safety-means preventing explosions, as f. i. a safety valve in the air pipings, belong also to the equipment of the producer although not shown.

Having now fully disclosed my invention, I claim and desire to secure by Letters Patent of the United States:

1. A process of continuously generating producer gas from solid fuel, said gas having a temperature over 1000° C. and composed essentially of carbon monoxide; hydrogen and nitrogen in the ratio of more nitrogen than carbon monoxide; which comprises injecting hot air into a lower coke zone in a gas producer and thereby generating producer gas and forming molten slag passing a portion of the hot producer gas into a superposed fuel preheating and distillation zone and preheating and coking the fuel therein, withdrawing the mixed producer gas and distillation vapors and gases, then passing the mixture together with the air into the incandescent coke zone and decomposing and fixing the vapors into gas, withdrawing the hot producer gas from the upper part of the incandescent zone and from below the superposed preheating and distillation zone, and withdrawing molten slag from the lower portion of the incandescent zone.

2. A process of continuously generating producer gas from solid fuel, said gas having a temperature over 1000° C. and composed essentially of carbon monoxide; which comprises injecting hot air into a lower coke zone in a gas producer and thereby generating producer gas and forming molten slag passing a portion of the hot producer gas into a superposed fuel preheating and distillation zone and preheating and coking the fuel therein, withdrawing the mixed producer gas and distillation vapors and gases, then mixing and burning the vapors and gases with the air, passing the mixture into the incandescent coke zone and decomposing and fixing the vapors into gas, withdrawing the hot producer gas from the upper part of the incandescent zone and from below the superposed preheating and distillation zone, and withdrawing molten slag from the lower portion of the incandescent zone.

3. A process of continuously generating producer gas from solid fuel, said gas having a temperature over 1000° C. and composed essentially of carbon monoxide, hydrogen and nitrogen in the ratio of more nitrogen than carbon monoxide; which comprises injecting hot air into a lower coke zone in a gas producer and thereby generating producer gas and forming molten slag, passing a portion of the hot producer gas into a superposed fuel preheating and distillation zone and preheating and coking the fuel therein, withdrawing the mixed producer gas and distillation vapors and gases, condensing tar from the mixture of gases and then passing the resulting stripped gases into the incandescent coke zone and decomposing and fixing the vapors into gas, withdrawing the hot producer gas from the upper part of the incandescent zone and from below the superposed preheating and distillation zone, and withdrawing molten slag from the lower portion of the incandescent zone.

4. A process of continuously generating producer gas from solid fuel, said gas having a temperature over 1000° C. and composed essentially of carbon monoxide, hydrogen and nitrogen, which comprises injecting hot air into a lower coke zone in a gas producer and thereby generating producer gas and forming molten slag, passing a portion of the hot producer gas into a superposed fuel preheating and distillation zone and preheating and coking the fuel therein, withdrawing the mixed producer gas and distillation vapors and gases, then passing the mixture into the incandescent coke zone and decomposing and fixing the vapors into gas, withdrawing the hot producer gas from the upper part of the incandescent zone and from below the superposed preheating and distillation zone, and withdrawing molten slag from the lower portion of the incandescent zone.

SVEN CARL GUNNAR EKELUND.